United States Patent [19]
Guck

[11] Patent Number: 5,794,039
[45] Date of Patent: Aug. 11, 1998

[54] METHOD FOR ABSTRACTING MESSAGES OF VARIOUS PROTOCOLS INTO OBJECTS FOR STORAGE IN A DATABASE

[75] Inventor: Randal Lee Guck, Dana Point, Calif.

[73] Assignee: Unisys Corp., Blue Bell, Pa.

[21] Appl. No.: 769,200

[22] Filed: Dec. 18, 1996

[51] Int. Cl.$^6$ ........................................... G06F 15/163
[52] U.S. Cl. ........................ 395/683; 707/4; 707/103; 707/10; 395/200.33; 395/200.36
[58] Field of Search .................. 707/10, 4, 103; 395/200.33, 200.36, 683

[56] References Cited

U.S. PATENT DOCUMENTS

| | | | |
|---|---|---|---|
| 5,283,887 | 2/1994 | Zachery | 395/500 |
| 5,361,349 | 11/1994 | Sugita et al. | 707/8 |
| 5,481,721 | 1/1996 | Serlet et al. | 395/683 |
| 5,548,753 | 8/1996 | Linstead et al. | 707/1 |
| 5,590,334 | 12/1996 | Saulpaugh et al. | 395/683 |
| 5,627,997 | 5/1997 | Pearson et al. | 395/500 |
| 5,657,250 | 8/1997 | Park et al. | 370/359 |
| 5,706,434 | 1/1998 | Kremen et al. | 395/200.48 |

*Primary Examiner*—Thomas G. Black
*Assistant Examiner*—Jean R. Homere
*Attorney, Agent, or Firm*—J. Ronald Richebourg; Mark T. Starr; Steven R. Petersen

[57] ABSTRACT

In accordance with the disclosed invention there is provided a method in a system server for storing and retrieving messages of various formats in an object database coupled to a network including a multiplicity of clients also coupled to the network. The server includes a CPU and at least one storage device coupled thereto for storing objects of the database. The method includes steps for driving a database that solves the problem of transforming incoming messages into objects for storage in the database and organizing the transformed messages into a hierarchy of objects in accordance with the purpose and destination of such incoming messages for storage in the database.

15 Claims, 13 Drawing Sheets

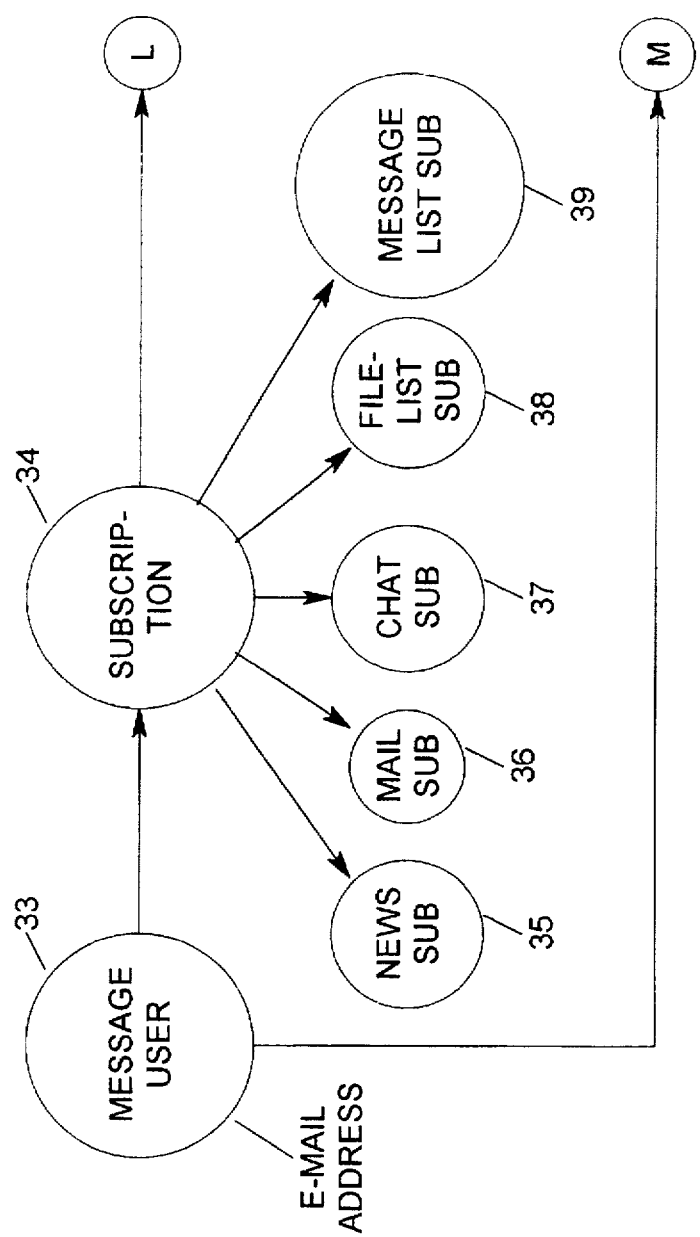
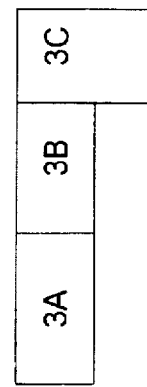
FIG. 3A
FIG. 3

METHOD FOR ABSTRACTING MESSAGES OF VARIOUS PROTOCOLS INTO OBJECTS FOR STORAGE IN A DATABASE

FIELD OF THE INVENTION

The present invention relates to a computer-implemented method for determining the type and content (or envelope and body) of incoming messages, transforming such messages into objects, and storing them in an object database for later retrieval, which database is part of a specialized server coupled to a network.

CROSS REFERENCE TO RELATED APPLICATIONS

This application relates to the following co-pending applications, assigned to the same assignee hereof, which are incorporated herein by reference.

U.S. Ser. No. 08/768,387, entitled AUTOMATIC FORMAT CONVERSION SYSTEM AND PUBLISHING METHODOLOGY FOR MULTI-USER NETWORK;

U.S. Ser. No. 08/768,386, a entitled SELECTIVE MULTIPLE PROTOCOL TRANSPORT AND DYNAMIC FORMAT CONVERSION IN MULTI-USER NETWORK; and, U.S. Ser. No. 08/769,199, entitled A METHOD FOR STORING/RETRIEVING FILES OF VARIOUS FORMATS IN AN OBJECT DATABASE USING A VIRTUAL MULTIMEDIA FILE SYSTEM.

BACKGROUND OF THE INVENTION

In the rapidly developing area of computer interconnecting technology and the Internet there is a need to provide systems and methodology that enable clients using one type of specialized protocol to communicate with other clients having different protocols. In current systems, users utilize software tools to create "messages" such as electronic news articles, mail messages, and interactive chat dialogs and subsequently send these messages across a network using standard protocols. However, in general a message can only be sent to and received by other users who are using similar tools that support the same protocol with which the message was sent.

It would be desirable to provide a network system where any client, no matter what type of message format or protocol is being used, could create, originate or author a message and enable this message to be transmitted and received by clients utilizing different message formats and protocols; and, also to have such a message receivable by appliances such as FAX machines or telephones. Heretofore, this has not been done with any great degree of efficiency. That is, an originator or author could not create a message in a particular computer format and send it to multiple receiver users or multiple receiver appliances without further complications. Such a system and methodology is now possible with the use of the method of the present invention.

Thus, it is an object of the present invention to provide a method for driving a database that solves the problem of transforming incoming messages into objects for storage in the database and organizing the transformed messages into a hierarchy of objects in accordance with the purpose and destination of such incoming messages for storage in the database.

Another object of the present invention is to provide an object database schema that mimics a file-based message management system, thereby creating a virtual message system that is more flexible and extensible than file-based message management systems.

A feature of the present invention is that by using an object database system, the object paradigm can be exploited to create a highly modular and extensible system. Extensions can easily be made after system deployment to track changes in standards (e.g., new message-oriented protocols). Moreover, additional modules can easily be developed and integrated with the virtual message system to address new content management requirements.

An advantage of the present invention is that by the use of "virtual" messages and message boards (instead of file-based message management systems), the user is not bound to the operating systems' inherent limitations. By using database objects as "virtual" messages, one can assign them additional properties that cannot be assigned to files.

Another advantage of the present invention is that by using an object database, virtual message objects can be interconnected with bi-directional references based on actual content interdependencies (e.g., embedded messages, related messages, etc.). These interconnections can be exploited in several ways, including but not limited to:

- the deletion of a message that is referenced by another message can be disallowed;
- a message's thread graph can be determined and reported on—a thread graph is the message and the set of all messages that are created in response to it;
- a virtual message can be extracted along with the set of messages in the same thread (i.e., the messages in its thread graph)—this allows a message to be easily distributed along with the set of messages which are part of the same topic;
- a virtual message can be converted from one format to another (e.g., e-mail to news article) or even into non-message oriented formats (e.g., html files); and,
- a virtual message can be made available via a wide range of protocols (FTP, HTTP, mail, news, etc.), allowing the same information to be disseminated in multiple ways without replication or manual conversion.

Yet another advantage of the present invention is that by using a portable (i.e., multi-platform) database system, virtual messages can have the same interface regardless of the operating system used. For example, message board name length and maximum message length can be consistent despite different conventions and limitations between the operating systems used.

Still another advantage of the present invention is that by the use of an object database management system greater security, integrity and recoverability is accomplished than would normally be received in a file-based message system.

SUMMARY OF THE INVENTION

In accordance with the above and other objects, features and advantages of the invention, there is provided a method in a system server for storing messages of various formats in an object database coupled to a network including a multiplicity of clients also coupled to the network. The server includes a CPU and at least one storage device coupled thereto for storing objects of the database. The method comprises the steps of receiving a message in the server from one of the clients, wherein the received message includes content and transmission information; and, determining if the received message can be accepted by the server. If it was accepted, creating a virtual message object of a type corresponding to the received message. An envelope of the received message is parsed and a message header object for each message field found is created. The message header created in the previous step is connected to the virtual message object. A message posting object corresponding to the received message is created and the message posting object is connected to both a message board object and the virtual message object. After the received message has been posted to the message board, a result is returned to the client.

The present invention also includes a method for retrieving messages of various formats stored in the database. This method comprises the steps of connecting one of the clients to the server using a protocol, and transmitting a "get" request; determining if the "get" request is for content, and if not; determining if the "get" request is for a list of attachments. If it is for a list of attachments, requesting a list of the immediate attachments of a multi-part message stored in the database; identifying a message using a message reference; and, identifying a message board. A message board object corresponding to the message board identified above is located. If the message board object was located, locating a "global" virtual message object indicated by the message reference identified above. A message posting object is located that connects the identified message board and the "global" virtual message object. The "global" virtual message object is used as a "perspective" virtual message object, and at least one virtual message object is connected to the "perspective" virtual message object as an "embedded" object. A determination is next made if the reference for the "embedded" message refers to a valid attachment relevant to a current one of the "perspective" objects; and if so, locate a virtual message object corresponding to the referenced attachment and marking it as a new "perspective" object. Each immediate message object of said "perspective" object is located and a response is formed and transmitted to the client.

BRIEF DESCRIPTION OF THE DRAWINGS

FIG. 3 is a unitary diagram showing the orientation of the sheets containing FIGS. 3A, 3B and 3C for a complete illustration.

FIGS. 3A, 3B and 3C combined form a taxonomy diagram illustrating the complete set of message types and subtypes for establishing a hierarchy of the various messages that are to be stored in the database.

DETAILED DESCRIPTION

Figure 1:
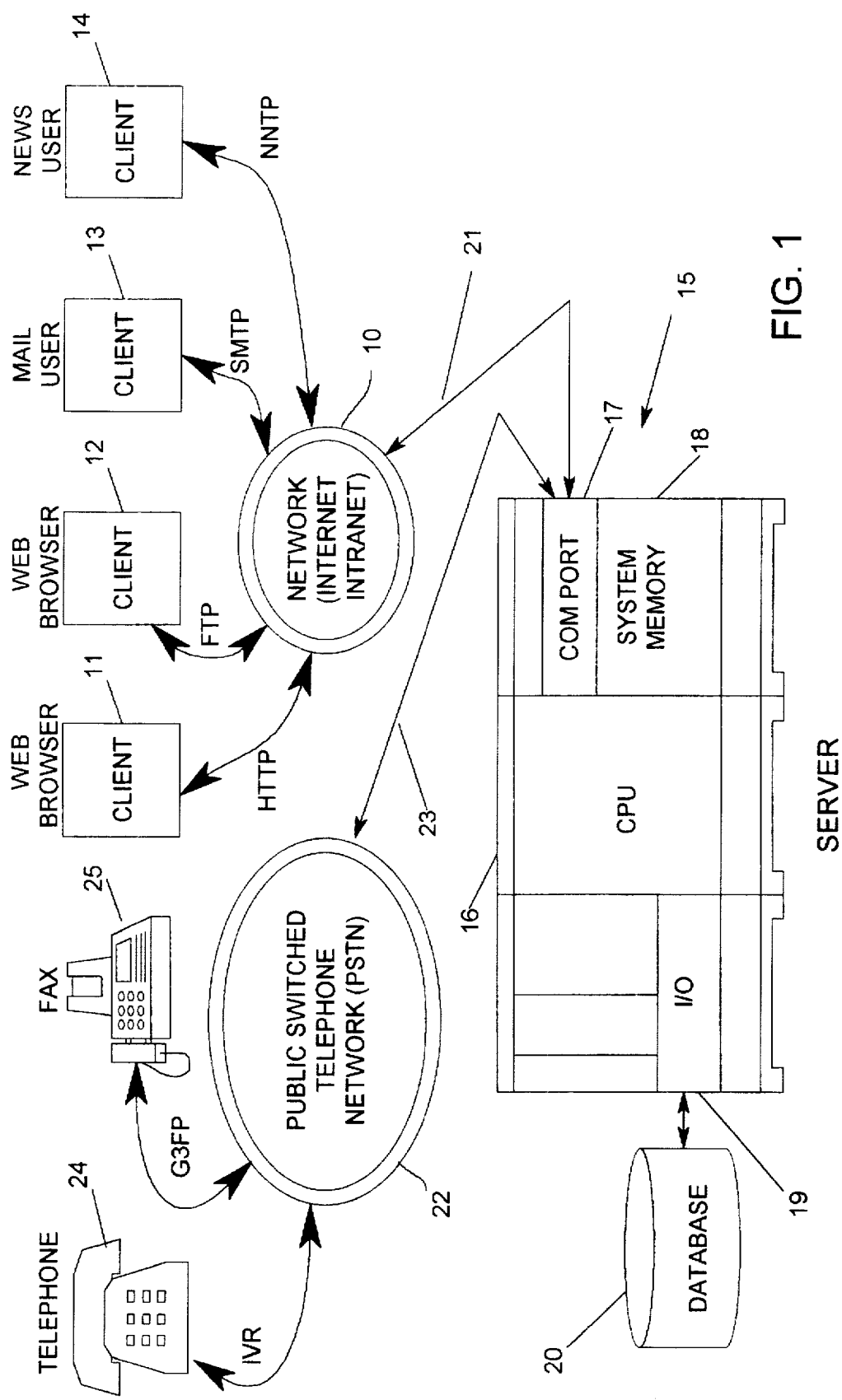
FIG. 1 is a generalized block diagram showing network system connections to clients and the server, including details of the server that executes the method of the present invention.

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

A normal object program stores objects in a computer system's memory. When the program terminates, the memory used by those objects is freed and reused by other programs, making the objects that the program stored transient. An object database stores objects in a nonvolatile memory, such as a computer disk. Since the information on a computer disk remains in existence, even when the computer is turned off, an object database provides the ability to persistently store objects. An object program that uses an object database thus has the option of storing objects transiently or persistently.

The term format as used herein refers to the specific arrangement of data on a disk drive to meet established requirements for storage and retrieval thereof. The term protocol as used herein refers to a set of formal rules describing how to transmit data, especially across a network. Low-level protocols define the electrical and physical standards to be observed, bit- and byte-ordering and the transmission and error detection as well as correction of the bit stream. High-level protocols deal with message formatting, including the syntax of messages, the terminal to computer dialogue, character sets, sequencing of messages, etc. The term schema as used herein refers to the logical description of data in a database, including definitions and relationships of data.

Referring now to FIG. 1, an overall block diagram of a network system that may employ the method of the present invention is illustrated. A flexible multi-user network system 10, which for purposes of this disclosure represents the Internet (or perhaps an Intranet) is shown coupled between clients 11 through 14 on one side of the network system and a server 15 on the other side. By way of illustration, the client 11 is shown coupled to the network 10 by way of a protocol referred to as HTTP (Hyper Text Transport Protocol). This is a client-server protocol used for information sharing on the Internet and is the basis of use for the World Wide Web (WWW). Client 12 is shown coupled to the network 10 by way of a File Transfer Protocol (FTP). This is a set of Transmission Control Protocol over Internet Protocol (TCP/IP) commands used to log onto a network, to list directories and to copy files.

Client 13 is shown coupled to the network 10 by way of the SMTP protocol, which denotes Simple Mail Transfer Protocol. This is a messaging protocol used by software applications to send and receive e-mail. The client 14, labeled News User, is shown coupled to the network 10 by way of a Network News Transfer Protocol ("NNTP"). NNTP is a protocol used for distribution, inquiry, retrieval and posting of News articles over the Internet.

The server 15 includes a CPU 16, a communication port 17, a system memory 18, and an I/O channel 19. A storage media suitable for storing a large database, such as a disk drive system 20, is coupled to the server 15 by means of an I/O channel 19 in a conventional manner. The server 15 is coupled to the network 10 by means of a cable 21 connected to the communication port 17. In a similar manner, a Public Switched Telephone Network 22 (PSTN) is coupled to a telephone 24 using an Interactive Voice Response protocol (IVR). This involves the generation of voice output by a computer. It provides pre-recorded information either with or without selection by the caller. Interactive Voice Response (IVR) also allows interactive manipulation of a database.

The facsimile or FAX machine 24 is coupled to the PSTN 22 by way of a special protocol such as the Group 3 Facsimile Protocol ("G3FP"), which is widely used for facsimile transmissions.

The server 15 operates as a computer in a network shared by multiple users. It can act as a file server whereby it uses a high-speed computer to store the programs and files that are shared by the various users on the network 10. Sometimes this is called a "network server", since it acts like a remote disk drive. The server 15 can also act as a database server in that it is dedicated to database storage and retrieval.

Among the problems characteristic of earlier networks was the lack of continuity of service. Thus, in many cases the user had to perform additional operations in order to make use of voice and FAX transmissions. The method of the present invention eliminates any such need for delay complications in order to handle telephone and FAX transmission. Further, the present invention provides a means for communication between multi-users, together with a simpler and more expanded method for sending data to different types of appliances operating under different protocols. This is handled by the server 15, which provides specialized techniques, as will be discussed hereinafter.

Figure 2:
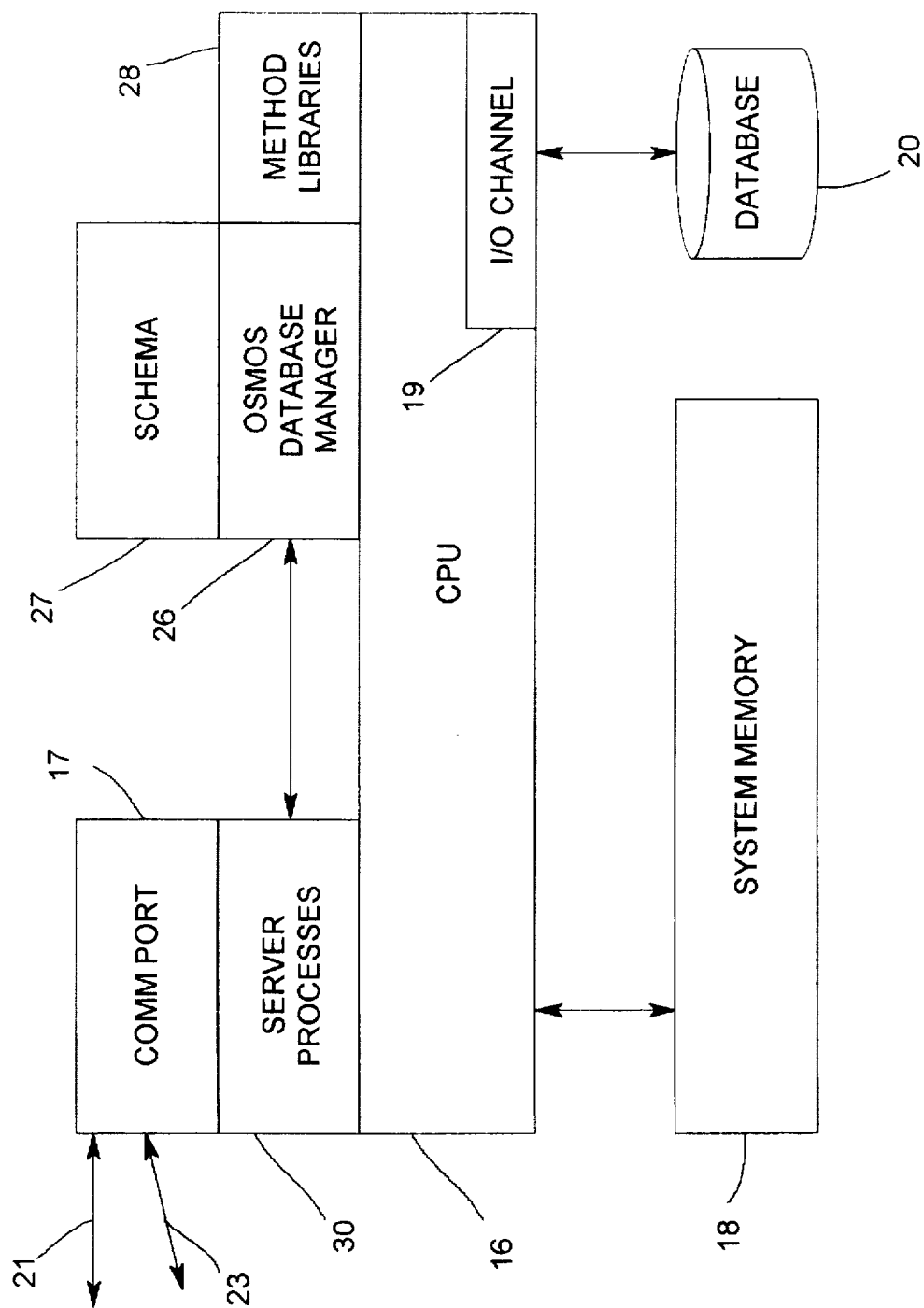
FIG. 2 is a block diagram showing the server (including software modules stored therein for implementing the method of the present invention), and a database storage mechanism coupled to the server.

Referring now to FIG. 2, a block diagram shows typical components of the server 15 and the software modules stored therein for implementing the method of the present invention, with the database 20 coupled to the server by means of the I/O channel 19. The server 15 includes the following software modules: a database manager 26, which is controlled by a schema 27 and a method libraries 28; and, a set of server processes 30 that service the various protocols on the network system 10. Each of these software modules will normally be loaded into the memory 18 from disk storage, or portions will remain on disk until required. Data is transferred from the network 10 or the PSTN 22 via the cable 21 or 23, respectively, through the communication port 17 and server process software 30 to the OSMOS database manager 26, and from there to the database 20 via the I/O channel 19. The CPU 16 executes instructions from the software modules using data from the communication port 17 or the database 20 for storing or retrieving the virtual messages in accordance with the method of the present invention as described in greater detail hereinbelow.

The database 20 provides an electronically stored collection of objects, such as document components (text, interdocument links, access rules), IVR components (call flows, voice prompts), multimedia components (audio, graphics, video) and message components (folders, news-groups, articles, e-mail messages). The database 20 is managed by the database manager 26, which comprises software that allows a user to manage multiple messages. In the present embodiment, the manager 26 is an object-relational database management system referred to herein sometimes as OSMOS, which is a software product available from the assignee hereof. OSMOS uses an object-relational model to provide its services and interfaces. Object-relational database systems combine the advantages of compatibility with the standard relational database model with the productivity advantages of object technology. It is noted, however, that other object databases will work satisfactorily with the present invention.

Message Storage Methodology

The OSMOS database manager 26 software enables database management capability for traditional programming languages, such as COBOL, BASIC, C and C++, and enables the storage and retrieval of data from the database 20 as will be described further hereinafter. The operational functioning of the OSMOS database manager 26 is handled by a schema 27 and a set of method libraries 28. More particularly, as will be amplified further hereinbelow the schema 27 mimics a message system so as to create a Virtual Message system that stores and categorizes message objects based on purpose. The term Virtual Message as used herein refers to the fact that messages stored in the database 20 are an image of real messages stored in one of the clients 11–14 coupled to the network system 10. Virtual Messages are stored in the database as one or more objects with the attributes (creation date, security, etc.) and contents (a stream of bytes) supported by operations within the database, which allows them to be manipulated in a variety of ways.

There are several advantages of the Virtual Message abstraction compared to file-based storage which is typically used. For example, as a series of database objects, a Virtual Message can possess additional information that a system-level file cannot. That is, the database can record more detailed information on the message's type, enforce greater security control and automatically manage versions. As an abstract object, a Virtual Message's content can be represented in a large number of ways. Content can be stored as a stream of bytes, just like that for normal messages; modeled as a network of semantic objects; synthesized on the fly from dynamic parameters, and so forth. As a database object a Virtual Message can possess encapsulated behavior which is used to process the message (update it, retrieve it, display it, delete it, etc.). As a resident on the database 20, a Virtual Message can be backed-up, recovered and otherwise administered with other content objects using a common set of tools and procedures. Although Virtual Messages are stored as abstract objects, their basis on the well-known message paradigm allows them to be easily accessible via message-oriented protocols such as SMTP, NNTP, etc.

The techniques with which a message is uniquely identified depends upon its usage context. For example, each news article message has an article number that is unique within a particular news group to which it has been posted. Each e-mail message may have a message id that is "world unique" because it identifies the originating host, user, date, time, and other information in a way that differentiates it from all other messages in the world.

A message has two distinct parts that comprise its content: an envelope and a body. A message's envelope describes the origination of the message, the intended use of the message, expiration date, identification, and other general properties of the message. For example, in an e-mail message, the envelope will contain information such as who the message is from, who it has been sent to, the subject of the message, and so forth. The body of a message contains the message's substantive content (e.g. e-mail message text, news article text, etc.).

The format of all messages is loosely or strictly based on an InterNIC (Internet Network Information Center) standard known as RFC 822. This standard formally defines a message's overall format, including the presence and delineation of its envelope and body. RFC 822 further defines how an envelope is divided into message headers, how message headers consist of a field name and field body, how field body text is folded onto multiple lines, and other aspects of message envelopes. RFC 822 further defines standard message header fields as well as how to include non-standard fields. RFC 822 also defines the overall format of the message body such as rules for encoding non-graphical characters within a message's body. Consequently, all messages have a common overall format.

At the same time, various extensions to RFC 822 define how, while still conforming to RFC 822, a message can conform to additional formatting constraints in order to express additional detail. For example, RFC 1521, the "MIME" standard, extends RFC 822 so that a message can contain multiple parts of potentially mixed type (e.g. an e-mail message with an attached image file.) Some standards, such as HTTP, are loosely based on RFC 822, supporting basic notions such as message envelopes and bodies while deviating from RFC 822 in terms of required message headers, overall body format, or other areas.

Messages are accessed almost exclusively via message-oriented protocols because they are intended to be transferred over a network. The most commonly-used protocols are extensions to RFC 822. For example, RFC 821, the Simple Mail Transport Protocol (SMTP), is an RFC 822-compliant extension for the transmission of e-mail messages. RFC 977, the Network News Transfer Protocol (NNTP), extends RFC 822 to provide for the transmission of news articles. Message-oriented protocols are mostly "high-level", meaning that they can be executed over a variety of lower-level protocols that control electrical characteristics of a network connection, bit and byte ordering, transmission speed, and so forth. Today, message-oriented protocols are executed mostly over TCP/IP-based network connections.

In general, a message is posted to one or more message boards, whose purpose is generally compatible with the format and purpose of a message. For example, e-mail messages are posted to mail folders, while news messages are posted to news groups. Some message board types may be arranged hierarchically, mail folders being the primary example. Other message boards, such as news groups, are usually not arranged hierarchically and hence appear "flat" in an organization.

Some kinds of messages can be posted to multiple message boards. This is commonly done with news messages. Although messages generally do not cross "genealogy" lines, they can, in theory, since they have a common underlying format. It is possible, for example, to post news articles in mail folders and e-mail messages in news groups. This kind of cross-genealogy posting is relatively new, however, since many issues must be worked out such as how to handle MIME-based messages in news groups.

A message is usually authored with an appropriate tool such as a client mail program or a news reader and posted to one or more message boards. The message may be subsequently read by few or many users over a short or long period of time, and then eventually deleted or archived to long-term storage. However, during its life-span, messages are rarely updated "in place". Instead, they are responded to, forwarded, or amended in some way, but each of these actions cause a new message to be generated with its own identification, and the old message is merely referenced or included as an attachment.

Another common characteristic of messages is that a user can "subscribe" to bulletin boards. This means that the server maintains knowledge of the fact the user is subscribed to a particular bulletin board and can assist him in using that bulletin board. For example, the server remembers which messages have been reviewed by the user in every subscribed bulletin board. Consequently, the user can ask the server at any time whether or not there are any new (unread) messages in any of his subscribed bulletin boards. Alternatively, a user can be notified when a new message appears in a subscribed bulletin board. For example, a user could be sent an e-mail message whenever a new news article is posted in a subscribed news group.

Figure 3B:
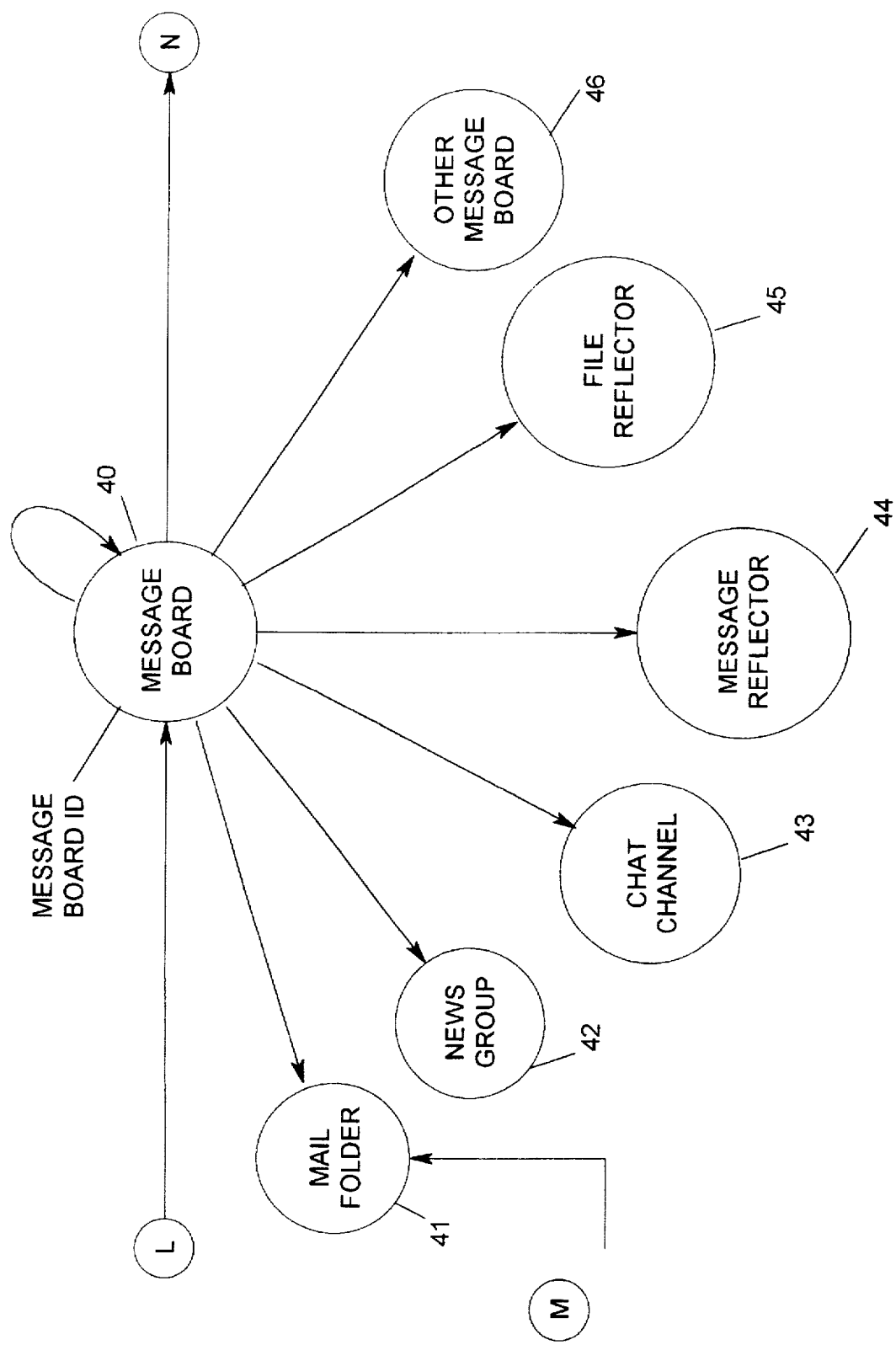
Figure 3C:
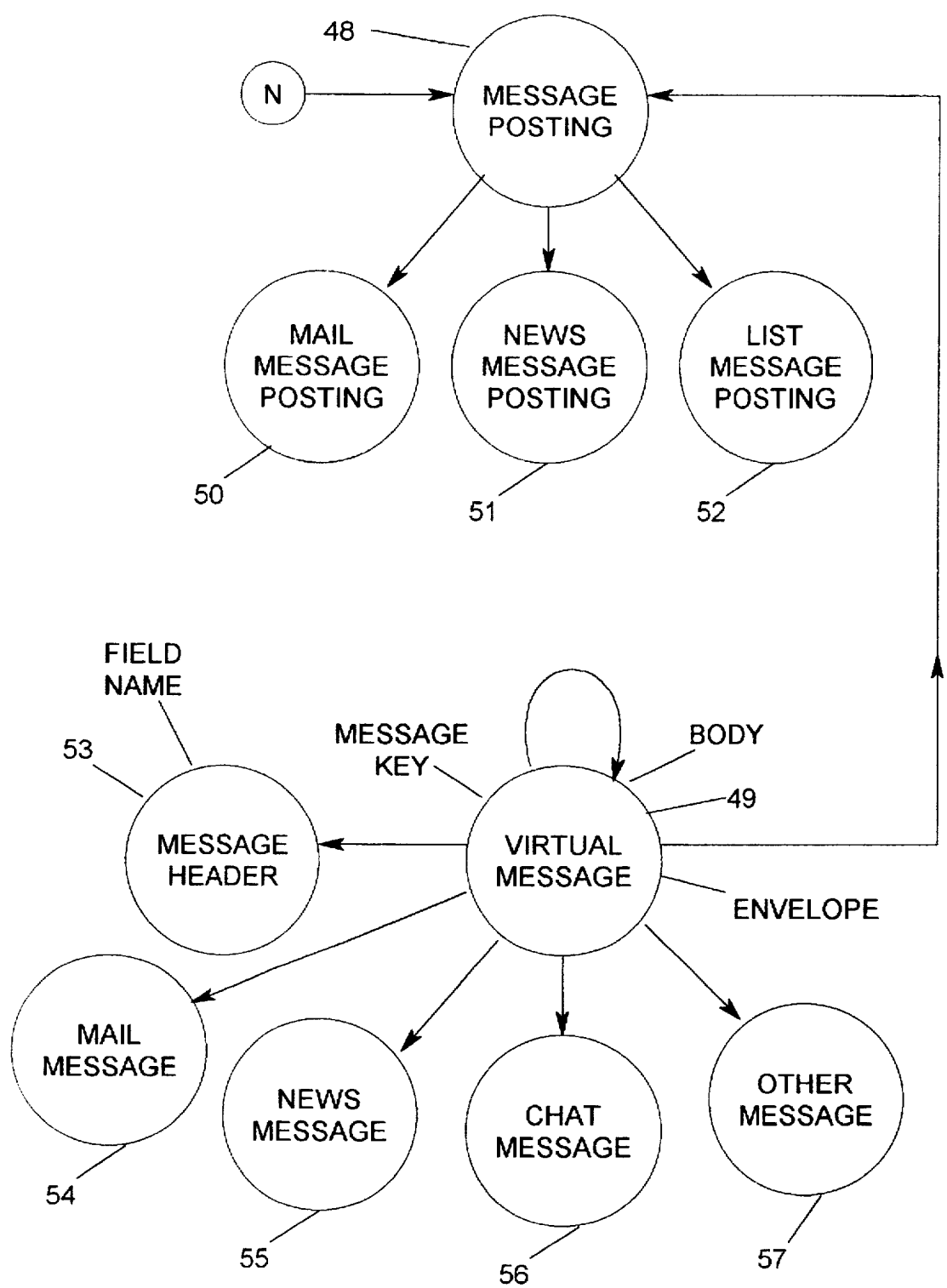

Referring now to FIG. 3, a unitary diagram of the orientation of the sheets containing FIGS. 3A, 3B and 3C is shown, and if these sheets are laid out as shown, one could view the entire taxonomy diagram of the generalized hierarchies which comprise the Virtual Message System. Beginning with FIG. 3A, a Message User type 34 holds "message user" objects. A message user is an Internet User who subscribes to one or more message boards. A message user typically has an e-mail address, which is stored as a property within the Message User type 34. Each message user points to any number of subscription objects that represent the user's message board subscriptions.

As shown, the Message User 33 points to a Subscription object 34, which possesses a plurality of "subtypes" for the various types of subscriptions that a user can possess. For example, the Subscription object 34 possesses a News Subscription subtype 35, a Mail Subscription subtype 36, a Chat Subscription subtype 37, a File List Subscription subtype 38 and a Message List Subscription subtype 39. Each subtype of the Subscription object 34 (i.e., subtypes 35-39) represents a user subscription to a message board. Consequently, such a Subscription object "connects" a Message User object with a Message Board object (shown in FIG. 3B and described further hereinafter) as depicted by a connector L. If the Message User 34 is using the server as a mail "post office", then it will also point directly to a Mail Folder object, which will be described hereinafter and the connection to which is depicted by a connector M. The News Subscription subtype 35 represents subscriptions to news groups; each News Subscription object will point to a Message Board object which is also a News Group object. In addition to connecting a Message User with a Message Board, each Subscription object will hold an additional state specific to the type of subscription. For example, the Mail Subscription object 36 will keep track of which mail messages have been read by the user.

Referring now to FIG. 3B, the connector L is shown pointing to the Message Board type 40, and the connector M is shown pointing to the Mail Folder type 41. The Message Board object is subtyped for each kind of message board. Each Message Board object will point to a set of Message Posting objects, which represent the messages posted to that message board. The Message Board objects hold a state specific to each kind of message board such as security requirements and policies for expiring old messages.

Each subtype of Message Board type 40 represents a specific kind of message board such as the Mail Folder subtype 41, a News Group subtype 42, a Chat Channel subtype 43, a Message Reflector subtype 44, a File Reflector subtype 45 and Other Message Board subtype 46. The Message Board subtype 40 also points to a Message Posting subtype 48, which is shown in FIG. 3C, as depicted by a connector N.

Referring now to FIG. 3C, the connector N from FIG. 3A points to the Message Posting subtype 48. Each message posting object connects a Message Board object with a Virtual Message object 49, thereby "posting" the message to the message board. The Message Posting object 48 is subtyped for certain kinds of message postings. In the disclosed embodiment the Message Posting object 48 possesses a Mail Message Posting subtype 50, a News Message Posting subtype 51, and a List Message Posting subtype 52. The subtypes 50–52 are able to hold a state specific for each posting object such as a unique identification of the related message within the related message board.

Each Virtual Message object represents a message. Each object holds state such as identification (e.g. message key) and content (e.g. envelope and body). Each Virtual Message object also points to Message Header objects 53, each of which represents a single header field within the message's envelope. The Virtual Message type is subtyped for various kinds of messages. In the disclosed embodiment the Virtual Message type 49 possesses a Mail Message subtype 54, a News Message subtype 55, a Chat Message subtype 56, and an Other Message subtype 57. The subtypes 53–57 are each capable of holding additional state specific to each kind of message object. For example, each News Message object is able to store a state about when the article that it represents should be expired and deleted from all posted news groups.

The Message Header type 53 represents message header fields which have been extracted from message envelopes. When a Virtual Message object is created, its entire envelope is stored within the message object, but the envelope is also "parsed" and a message header is created for each message header field found, and the Message Header object 53 is connected back to the message object. The purpose of the Message Header type 53 is to allow individual message headers to be searched in order to find a particular message. For example, the "subject" field can be found and examined for a large number of e-mail messages by performing an appropriate search on the Message Header type.

Figure 4A:
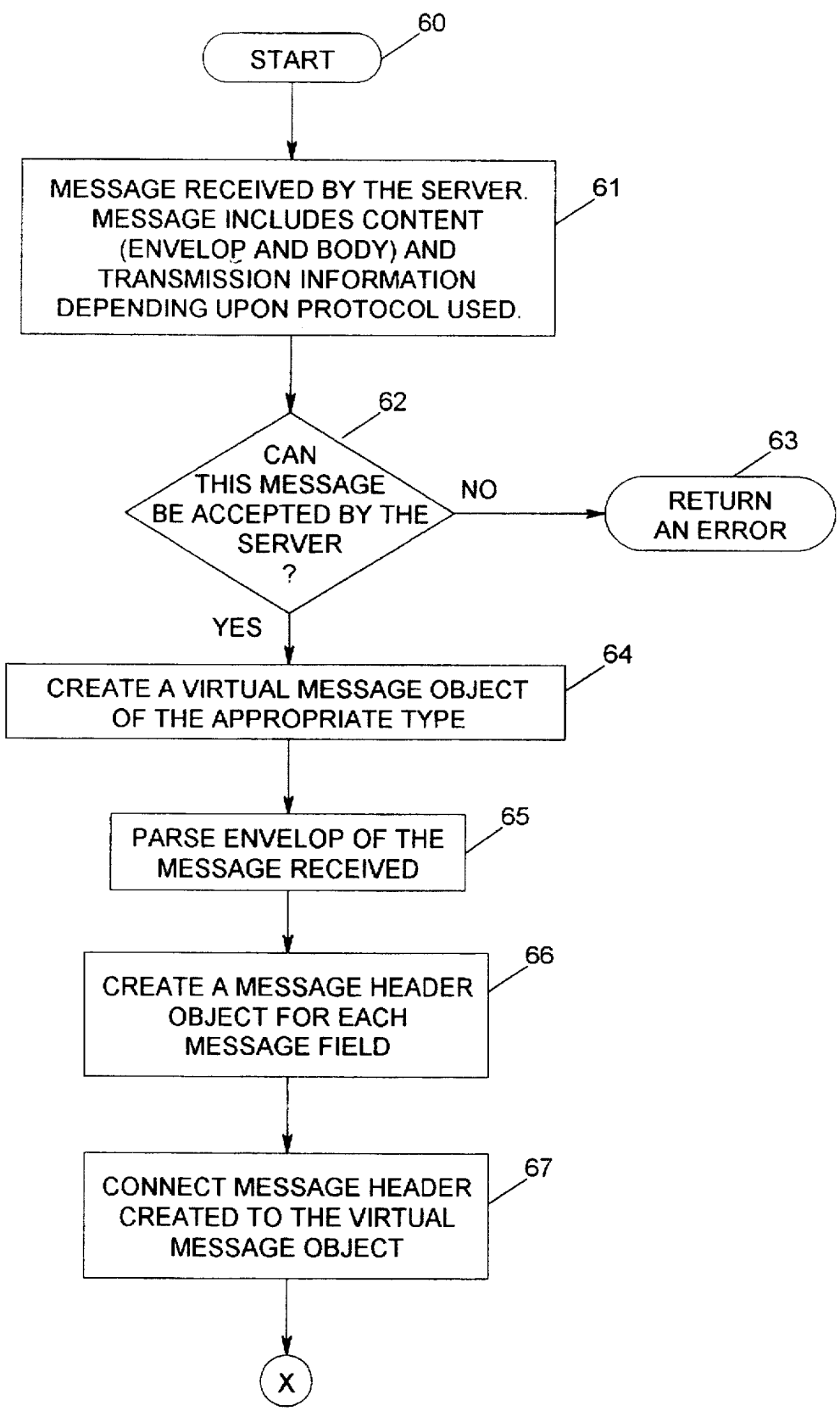
FIGS. 4A and 4B combined form a flow chart illustrating the process for storing messages in the database as a virtual message.

Referring now to FIG. 4A, which is the first of a two-part diagram, the process for storing messages in the database as virtual messages is shown. The process begins with a start bubble 60 followed by a process step (block 61) of the server receiving a message, which includes content (envelope and body) and transmission information depending upon the protocol used. For example, SMTP will include a list of one or more "addresses", each of which contains the e-mail address for which the message is intended. In the NNTP protocol, the message will include a list of news groups to which the message should be posted.

An inquiry is next made as to whether or not the message can be accepted by the server (diamond 62). The server must validate whether or not the message can be accepted. For example, the server validates that at least one of an e-mail message's addresses has an inbox on the server. If the message cannot be accepted, an error is returned (bubble 63) to the client and the transmit request is aborted. On the other hand, if the message can be accepted a process step (block 64) of creating a virtual message object of the appropriate type is performed. In the case of an e-mail message, a Mail Message object is created. For a news message, a News Message object is created. The transmitted envelope and body are stored within the object.

After the message is created, its envelope is parsed (block 65). This operation is performed to create the Message Header objects which are used for later searching. For each message header field found, a Message Header object is created (block 66) and connected to the Virtual Message object (block 67). The process continues on FIG. 4B, as indicated by a connector X.

Figure 4B:
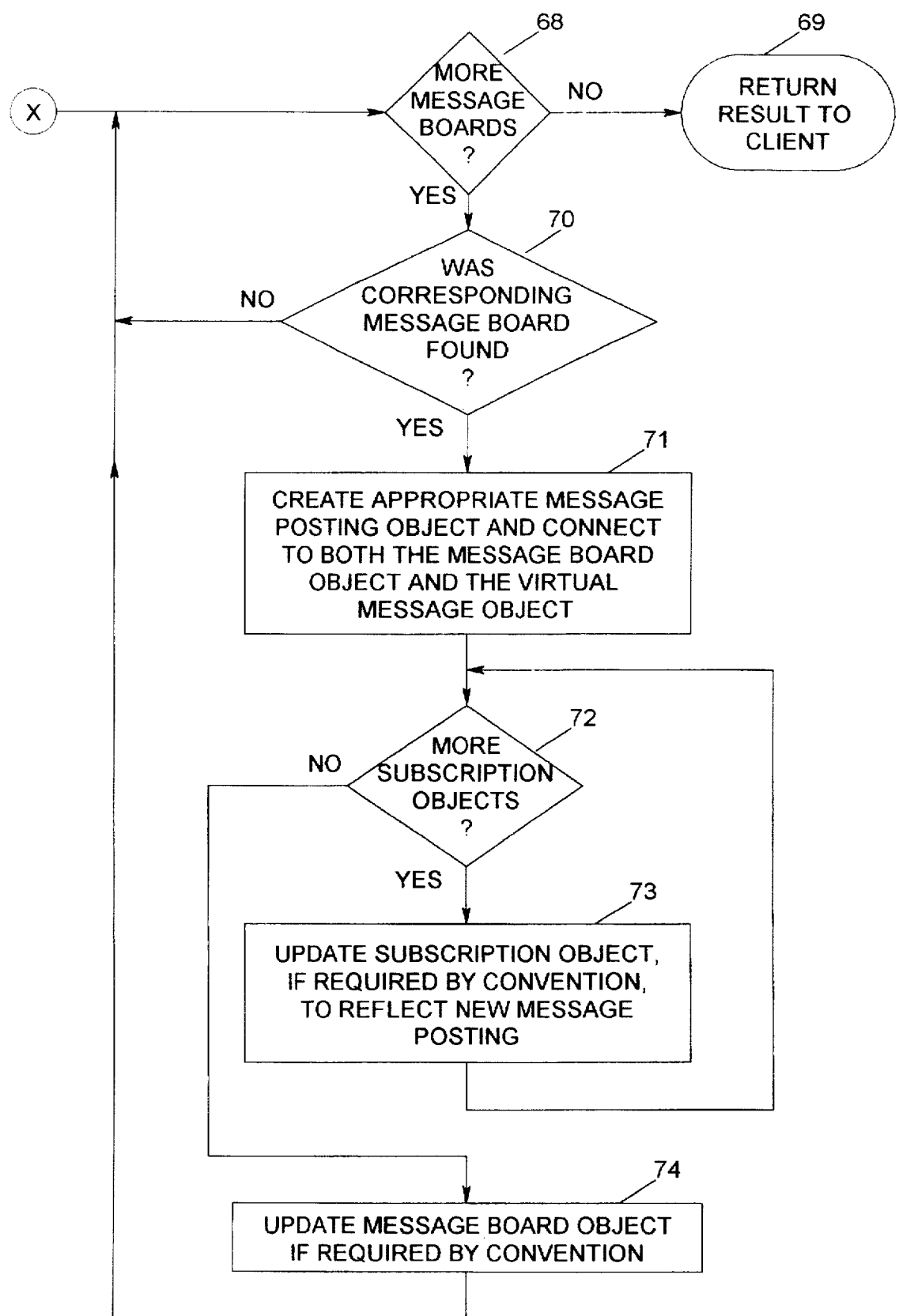

Referring now to FIG. 4B, from the connector X an inquiry is made as to whether or not there are more Message Boards (diamond 68). This is the beginning of a series of steps performed for each Message Board to which the received message is to be posted. If there are no more Message Boards then the result is returned to the client (bubble 69). On the other hand, if there are more Message Boards, another inquiry is made as to whether or not the Message Board was found (diamond 70). If it was not found a return is made back to the diamond 68 to begin processing of the next Message Board. In other words, it is not an error if the message indicates posting to a message board which the server does not maintain. Such message boards are simply skipped.

If the Message Board object is found (i.e., yes exit from the diamond 70), an appropriate Message Posting object is created (e.g., Mail Message Posting 50, News Message Posting 51, etc.), and the new posting object is connected to both the Message Board object 40 and the Virtual Message object 49. This process step is depicted by a process block 71 (see FIGS. 3A–3C). Following this, an inquiry is made as to whether or not there are more Subscription objects for the current Message Board object (diamond 72). If the answer to this inquiry is yes, then a process step of updating the Subscription object (if required by convention) is performed (block 73). For example, the Subscription object may be connected to the posting object as a new "unread" message. On the other hand, if there are no more Subscription objects then a process step of updating (if required by convention) the Message Board object to reflect the newly posted object is performed (block 74). Once this step has been performed, a return is made back to the entry of the inquiry diamond 68 for processing the next Message Board.

Message Retrieval Methodology

All messages—mail, news, chat, etc.—contain an envelope and a body. Most message retrieval is straightforward, and involves locating the message and then returning the envelope and body according to the rules of the protocol. Even when a message is a "multipart" message, which contains one or more attachments, the attachments are encoded within the body, and one normally sends the entire body back to the client. Consequently, the client is left to decode the multipart message, extract the attachments, decode them, etc. However, a more difficult problem arises when a message is retrieved via a protocol other than the one with which it was created. That is, when an e-mail message (which is normally sent to the server via SMTP and retrieved from the server via POP3 or IMAP4) is to be retrieved via an "alternate" protocol such as NNTP (news), FTP (file transfer) or HTTP (Web). To accomplish this, a shadow/converter mechanism must be used because a shadow object must be created and connected to some container which the alternate protocol will see. For example, an e-mail message must be shadowed by a news article which must then be posted to some news group in order to be seen by NNTP. Likewise, the e-mail message must be shadowed by a virtual file within some directory in order for the file-oriented protocols (FTP, HTTP) to see them. For a more detailed description of the shadow/converter mechanism reference is made to a copending patent application Ser. No. 08/768,387, entitled AUTOMATIC FORMAT CONVERSION SYSTEM AND PUBLISHING METHODOLOGY FOR MULTI-USER NETWORK, assigned to the same assignee hereof.

A novel feature of the method of the present invention is that the attachments within a multipart message can be viewed and retrieved individually. That is, even though multipart messages are normally authored and retrieved as a single unit, by use of the method of the present invention one can access the attachments individually. This can be very useful for a number of reasons. First, a multipart message with multiple or long attachments can be quite large and difficult to "digest" by a client in one gulp. Second, attachments can include any kind of data, and the client may not be able to process one or more attachments in a given message. For example, an attachment could be a PowerPoint presentation, and the client may not have a PowerPoint viewer. Third, an attachment could itself be a multipart message containing any number of embedded attachments. Hence, attachments can be nested arbitrarily deep and can be difficult to navigate by the client. For these reasons, it is very useful to access the parts of a multipart message independently.

As currently defined, the standard protocols do not provide a built-in way of accessing the individual parts of a multipart message. However, one can provide this capability in at least two different ways. First, a standard protocol can be extended to allow it to access the attachments. For example, in many protocols (POP3, IMAP4, NNTP), the client fetches a message from a specific message board (e-mail folder, news group, etc.) by referring to it via a unique integer (e.g. e-mail message number 10, or news article number 15). We can extend the protocol so that the client can use a Dewey decimal-like number, which is an extension to an integer. For example, an e-mail client could ask for e-mail number 10.3 (within a certain folder), which could be interpreted that he wants the third attachment of message number 10. A news client could ask for article number 15.2.1, which could be interpreted as the first attachment within the second attachment within article number 15. (Attachment 15.2 would have to be a multipart message itself.) One could further extend the protocol to allow the client to ask for a "list" of the attachments without asking for the attachments themselves. For example, the message number 10.0 could be interpreted as "give me message number 10 without the attachments but with a list of the attachments, if any". The message number 15.2.0 would mean "give me the attachment number 15.2 with a list of its attachments, if any".

The second way in which multipart attachments can be accessed is by providing an alternate protocol with which multipart messages can be accessed. This is accomplished by providing HTTP "gateways", which allow message retrieval and manipulation of message boards. A standard HTTP browser is connected to a URL, which acts like a "home page" for a particular message board. For example, there is an HTML page for every e-mail user's inbox and a page for every news group. The page has hyper-links for each message within the corresponding message board. When the user clicks on one of the hyper-links, the browser sends an HTTP "get" request for a specific URL to the server, which the server can accurately decipher as a request for a specific message within the message board. If the message is not a multipart message, its content is simply formed into a new HTML message and returned to the user. (The HTTP message is constructed in an "intelligent" way that let's the browser understand its content-type. Hence, if the content is audio/wav, the browser will invoke an appropriate audio/wav player and the user will actually "listen" to the attachment. Likewise for video, images, etc.). However, if the message is a multipart message, an HTML page is constructed with new hyper-links for each embedded attachment and then returned to the user. If the user clicks on one of these hyper-links, the corresponding attachment is returned with the same algorithm: either its non-multipart content is returned, or a new HTML page is returned with hyper-links for the next level attachments. With this mechanism, a standard HTTP browser can easily browse an arbitrarily complex multipart message.

The above description emphasizes the fact that the method of the present invention is specifically designed to allow access to multipart message attachments. Within the database, any virtual message object can be asked for a list of its attachments via a "list attachments" function. When this occurs for the first time for a multipart message, an "explode message" function is implicitly invoked. This function causes the message's body to be searched for the first level attachments, and an "embedded" virtual message is created for each one. The set of embedded virtual message objects are then used to formulate the response appropriate for the "list attachments" call. The embedded virtual messages are created in a way that allows them to appear as normal message objects, but their envelope and body are not extracted from the "host" message's body and replicated. Instead, they utilize internal pointers which merely allow them to refer to the location of their envelope and body within the host message and return these items when called. Since an embedded virtual message appears as a "normal" message object, it can be independently referenced (e.g. by message key). This is how a unique hyper-link can be constructed which refers to it. Likewise, the "list attachments" function can be called for an embedded message and, if it is a multipart message, "explode message" is called, and another level of embedded virtual messages is created. Consequently, embedded virtual message objects are created only as needed (which saves processing time) and in a way that prevents content replication (which saves space).

Figures 5, 5A:
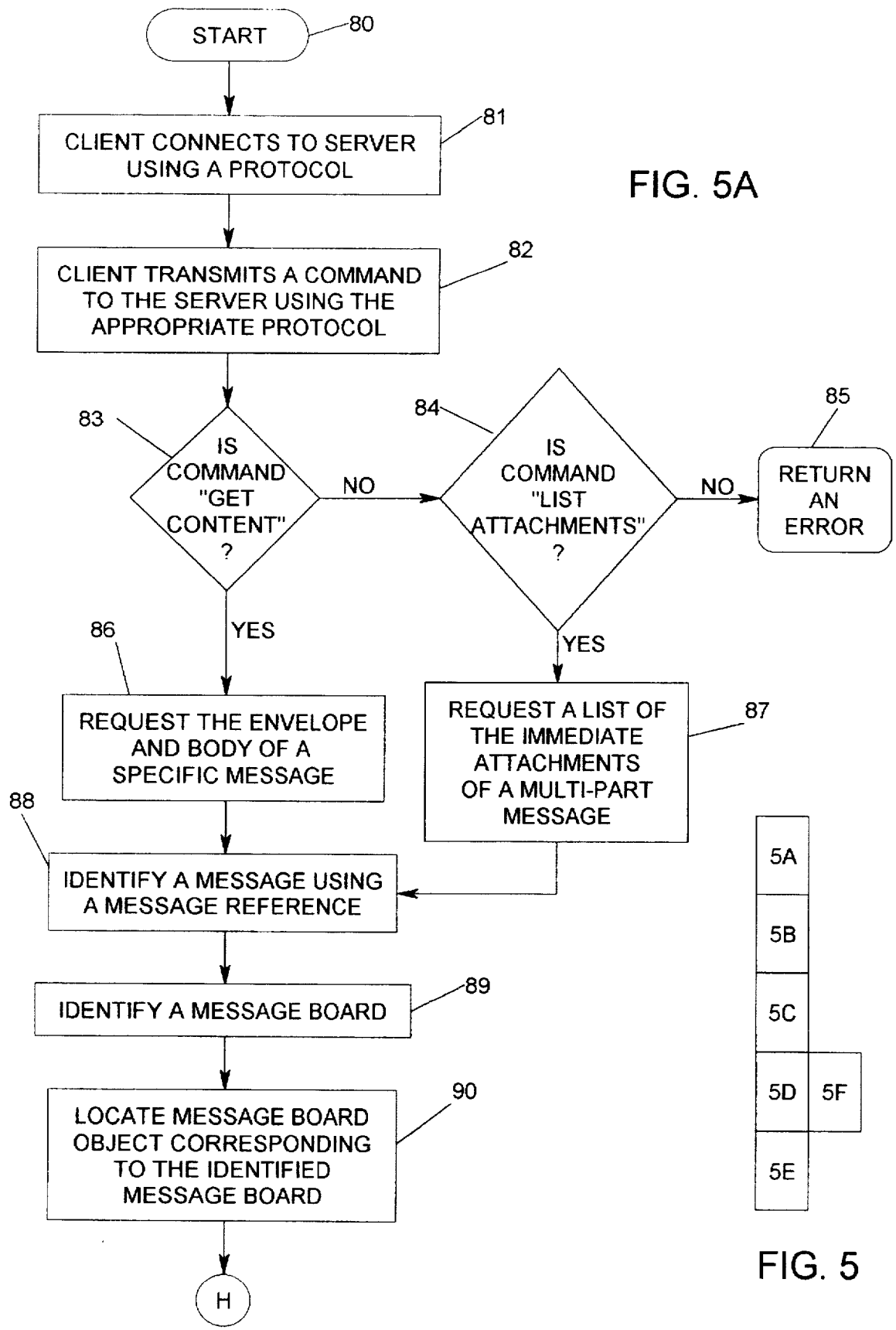
FIG. 5 is a unitary diagram showing the orientation of the sheets containing FIGS. 5A–5F for a complete illustration.
FIGS. 5A–5F combined form a flow chart illustrating the process for retrieving a message or a multi-part message from the database.

Referring now to FIG. 5, a unitary diagram illustrates the layout for the next six sheets of drawings in order to view a complete flow chart of the process for retrieving previously-stored messages or a list of the attachments of a multipart message from the database 20. With reference to FIG. 5A, the process begins with a start bubble 80 followed by a process step of connecting one of the clients 11–14 to the server 15 (block 81). A client connects to the server 15 using either a standard protocol (FTP, HTTP, POP3, IMAP4, NNTP, etc.) or a proprietary protocol designed for specialized access to the server. The client transmits either a "get content" or "list attachments" command in a manner appropriate for the protocol (block 82). The process next determines if the command is a "get content" command (diamond 83); and if not, an inquiry is made as to whether or not it is a "list attachments" command (diamond 84). If the command is neither, an error is returned (block 85).

If the command is a "get content" command, then the envelope and body of a specific message is requested (block 86). If the command is a "list attachments" command, then a list of the immediate attachments of a multipart message is requested (block 87). However, each of the commands must uniquely identify a message using a message reference (block 88), and they must also identify a message board (block 89). For example, the command may reference a news group by name and a particular article within that news group by its article number. The message reference may specify a "global" message (e.g. "article 5") or an attachment within a multipart message (e.g. "article 5.2"). Since attachments may themselves be multipart messages, the message reference may have an arbitrary number of levels in referring to an attachment (e.g. "article 5.2.3").

Figure 5B:
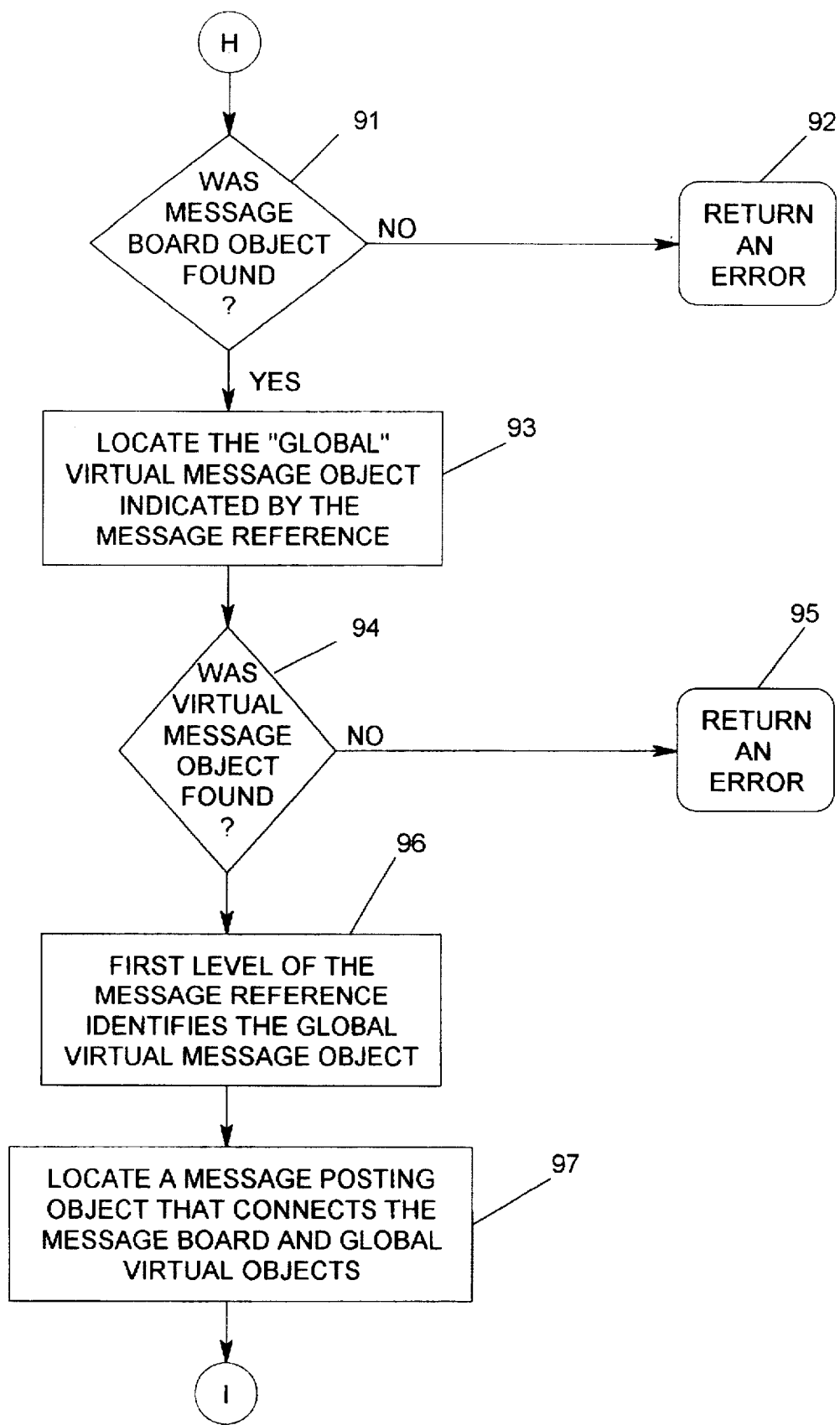

The process operating in the server 15 next locates the Message Board object corresponding to the referenced message board (block 90). At this juncture of the description reference is made to the continuation of the illustrated process in FIG. 5B, as depicted by a connector H. An inquiry is made as to whether or not the Message Board object was found (diamond 91). If the Message Board object cannot be found, an error is returned to the client as depicted by a block 92. On the other hand, if it was found the process locates the "global" Virtual Message object indicated by the message reference (block 93). Following this, an inquiry is made as to whether or not the Virtual Message object was found (diamond 94). If it was not found an error is returned (block 95). On the other hand if it was found and if the message reference refers to an attachment within a multipart message, then the first level of the message reference identifies the global Virtual message object (block 96). If the message reference does not refer to an attachment, the message reference itself identifies the global Virtual Message object. For example, in each of the message references "article 5", "article 5.2", and "article 5.2.3", the global Virtual Message object identified is "article 5". If the global Virtual Message object cannot be found, an error is returned to the client.

Figure 5C:
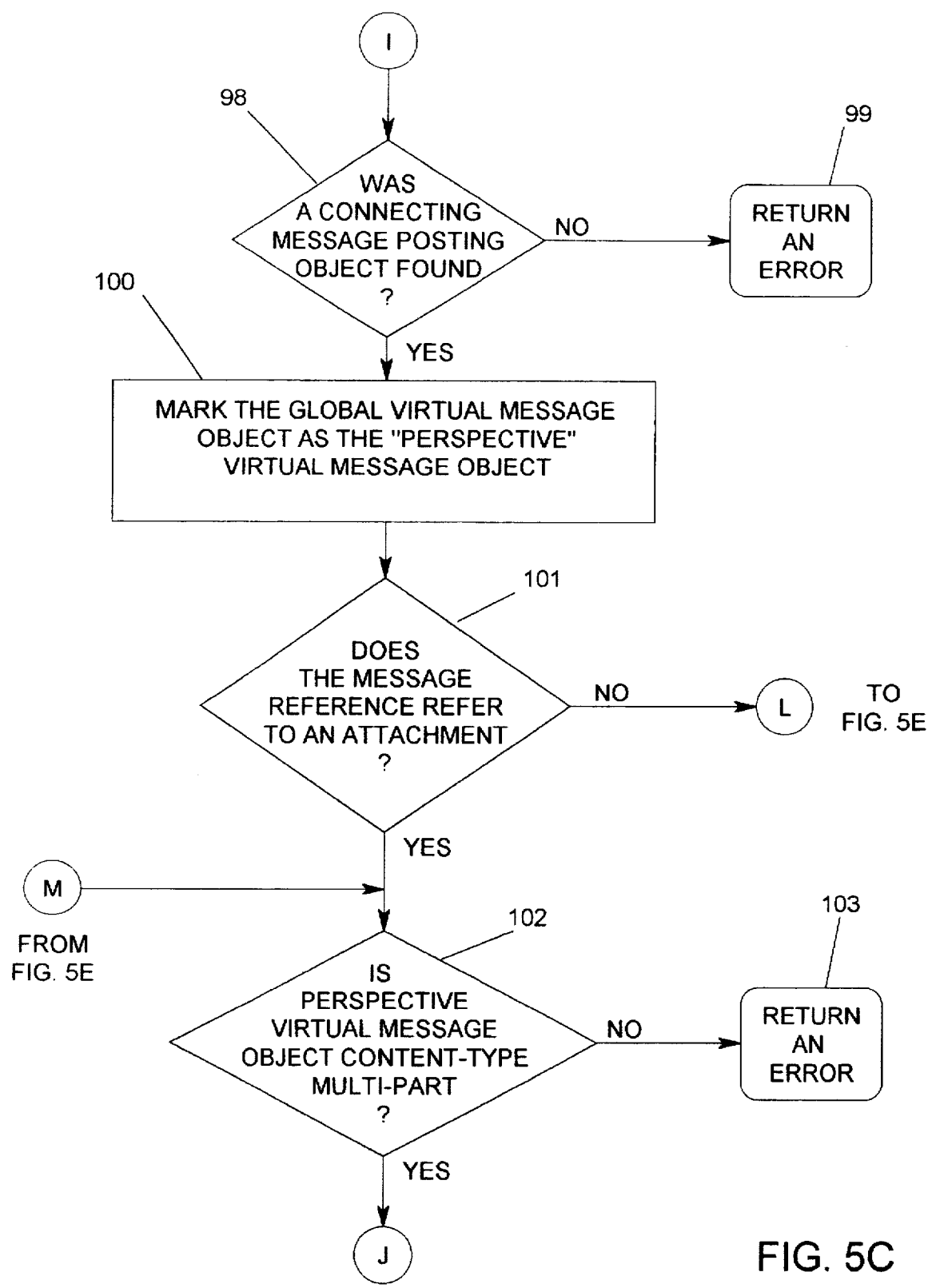

The process checks that the global Virtual Message object is posted to the Message Board object by locating a Message Posting object that connects the Message Board and global Virtual Message objects (block 97). Referring now to FIG. 5C for a continuation of the illustration of the process (connector I), an inquiry is made as to whether or not a connecting message posting object was found (diamond 98). If a connecting Message Posting object cannot be found, an error is returned to the client (block 99). On the other hand, if it was found the global Virtual Message is marked as the "perspective" Virtual Message object (block 100).

Figure 5D:
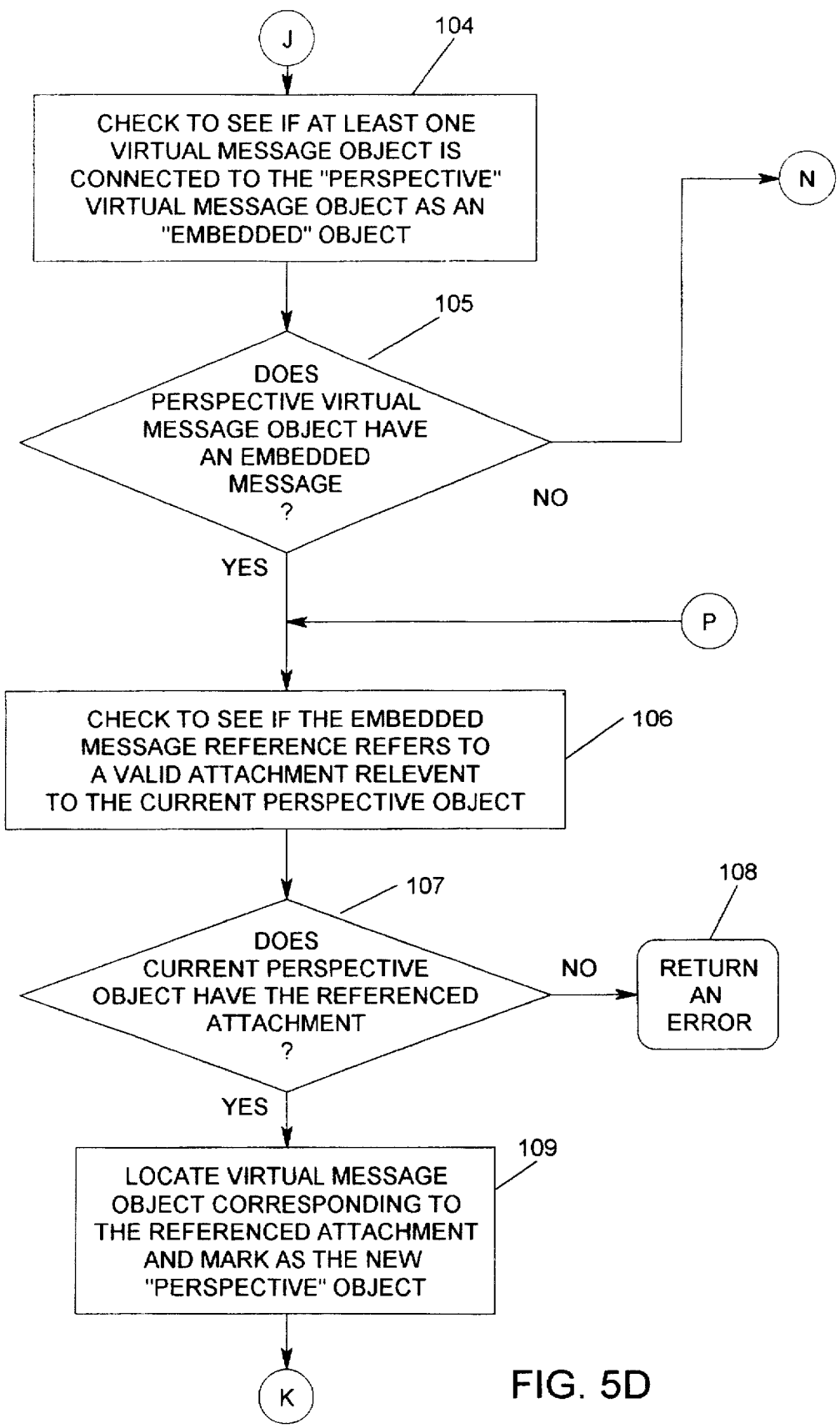
Figure 5E:
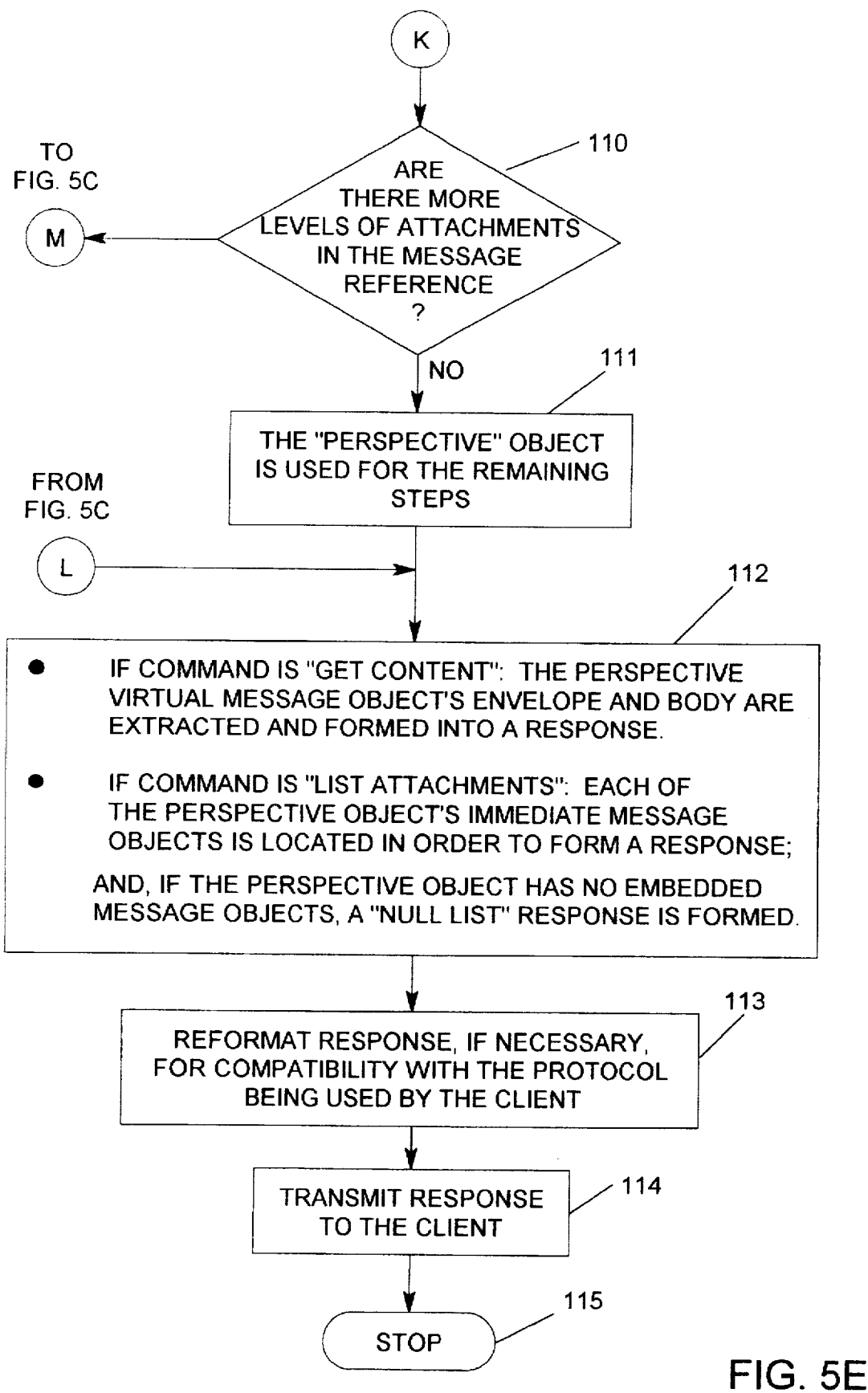

An inquiry is next made as to whether or not the message reference refers to an attachment (diamond 101). If the answer to this inquiry is no then a branch is taken to another part of the process (described hereinafter and shown in FIG. 5E, as indicated by a connector L). On the other hand, if the message reference does refer to an attachment, then another inquiry is made as to whether or not the perspective Virtual Message object content-type is multi-part (diamond 102). If the answer to this inquiry is no then an error is returned (block 103) because only multi-part messages have attachments. At this juncture reference is made to FIG. 5D for a continuation of the process description as depicted by a connector J.

If the perspective Virtual Message object content-type is multi-part, it is checked as to whether or not it has been "exploded". This is done by checking to see if at least one other Virtual Message object is connected to it as an "embedded message" (block 104). An inquiry is next made to determine if the perspective Virtual Message object has an embedded message (diamond 105). If the answer to this inquiry is no then a branch is taken to a routine that will be described hereinafter and illustrated in FIG. 5F, as denoted by a connector N.

On the other hand, if the Virtual Message object does have an embedded message, then a check is performed to see if the message reference refers to a valid attachment relevant to the current perspective object (block 106). For example, if the message reference is "article 5.2.3" and the current perspective object is the global message object (article 5), then a check is performed to ensure that the global message object has at least two (2) attachments. If the current perspective object is the second attachment of article number 5 (article 5.2), then a check is performed to ensure that it has at least three (3) attachments. If the current perspective object does not have the referenced attachment, an error is returned to the client (block 108).

On the other hand, if the answer to this inquiry is yes, then the Virtual Message object corresponding to the referenced attachment is located and marked as the new "perspective" object (block 109). The process continues in FIG. 5E as depicted by a connector K.

An inquiry is next made as whether or not there are more levels of attachments in the message reference (diamond 110). If the answer to this inquiry is yes, then the process is repeated (back to diamond 102, FIG. 5C as depicted by a connector M). If there are no more levels in the message reference, then the perspective object is used for the remaining steps (block 111). If the command is a "get content" command, the perspective Virtual Message object's envelope and body are extracted and formed into a response. If the command is a "list attachments" command, each of the perspective object's immediate embedded message objects is located and examined in order to form a response. For example, the size, content-type, and attachment number can be extracted from each embedded message object and formed into a response. If the perspective object has no embedded message objects, a "null list" response is formed (all as shown in block 112).

The response is reformatted, if necessary, for compatibility with the protocol being used by the client (block 113). For example, if the protocol is a message-oriented protocol (e.g., IMAP4, NNTP, POP3), the response is sent as a properly formatted RFC822 message. If the protocol is a file-oriented protocol (e.g., FTP), the response is formatted into a single stream of bytes. If the protocol does not allow binary character transmission and the response contains binary data, the response is encoded with an encoding scheme such as BASE64. Finally, the response is delivered to the client (block 114) and the process is stopped (bubble 115).

Figure 5F:
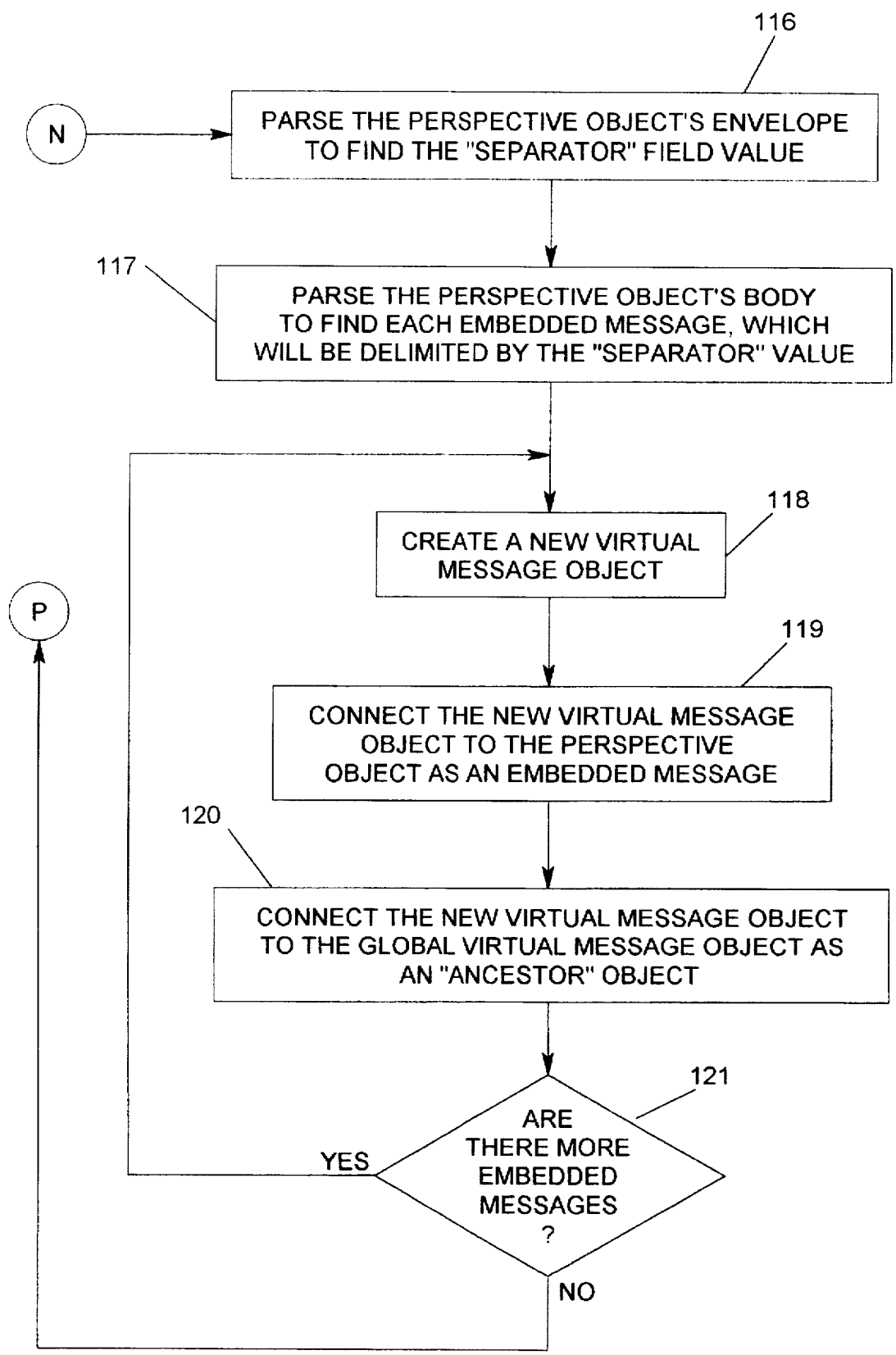

Referring now to FIG. 5F, the routine for exploding of the perspective Virtual Message object where it has no embedded messages is illustrated. Beginning with the connector N (from the diamond 105, FIG. 5D), the perspective object's envelope, which is stored within the global Virtual Message object, is parsed to find the "separator" field value (block 116). The perspective object's body, which is also stored within the global Virtual Message object, is parsed to find each embedded message that will be delimited by the separator value (block 117). For each embedded message, the following steps are performed:

- a new Virtual Message object is created (block 118);
- the new Virtual Message object is connected to the perspective object as an embedded message (block 119); and,
- the new Virtual Message object is connected to the global Virtual Message object as an "ancestor" object, and it is updated with information that allows the embedded message's envelope and body to be easily found within the global Virtual Message object (block 120). This means that global object's envelope and body are not replicated in order to create embedded Virtual Message objects.

An inquiry is next made as to whether or not there are more embedded messages (diamond 121), and if the answer to this inquiry is yes, then a return is made back to the block 118 for processing. Finally, if there are no more embedded messages then a return is made back to the block 106, FIG. 5D, as denoted by a connector P.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a system server for storing messages of various formats in an object database coupled to a network including a multiplicity of clients also coupled to said network, said server having a CPU and at least one storage device coupled thereto, said storage device being disposed for storing messages as objects of said database, a method for storing messages of various formats received from one or more of said clients in said database, said method comprising the steps of:
   a. receiving a message in said server from one of said clients, wherein said received message includes content and transmission information;
   b. determining if said received message can be accepted by said server, and if so;
   c. creating a virtual message object of a type corresponding to said received message;
   d. parsing an envelope of said received message and creating a message header object for each message field found;
   e. connecting said message header created in the previous step to said virtual message object;
   f. creating a message posting object corresponding to received message, and connecting said message posting object to both a message board object and said virtual message object; and,
   g. after said received message has been posted to said message board, returning a result thereof to said one of said clients.

2. The method as in claim 1 further comprising the steps of returning an error and aborting request to store said received message if it cannot be accepted by said server.

3. The method as in claim 1 wherein said received message is an e-mail message, said step of creating a virtual message object includes of creating a mail message object.

4. The method as in claim 1 wherein said received message is a news message, said step of creating a virtual message includes creating a news message object.

5. The method as in claim 1 wherein said received message includes an envelope and body and further comprising the step of storing said message envelope and body within said virtual message object.

6. The method as in claim 1, wherein for each subscription object connected to said message board, updating each of said subscription objects to reflect a new message posting.

7. The method as in claim 6 wherein said step of updating includes the step of connecting said message posting object as a new unread message.

8. The method as in claim 1 further including the step of updating said message board object to reflect a newly posted message.

9. The method as in claim 8 wherein said step of updating said message board object, and said message board object is a news group object, further including the step of reflecting a new total message count.

10. The method as in claim 8 wherein said step of updating said message board object, and said message board object is a news group object, further including the step of reflecting a new last updated time stamp.

11. In a system server for storing messages of various formats in an object database coupled to a network including a multiplicity of clients also coupled to said network, said server having a CPU and at least one storage device coupled thereto, said storage device being disposed for storing objects of said database, a method for retrieving messages of various formats stored in said database, said method comprising of the steps of:
   a. connecting one of said clients to said server using a protocol, and transmitting a "get" request;
   b. determining if said "get" request is for content, and if not;
   c. determining if said "get" request is for a list of attachments; and if so;
   d. requesting a list of the immediate attachments of a multi-part message stored in said database;
   e. identifying a message using a message reference;
   f. identifying a message board;
   g. locating a message board object corresponding to said message board identified in step f hereof;
   h. determining if said message board object was located, and if so;
   i. locating a "global" virtual message object indicated by said message reference identified in step e hereof;
   j. locating a message posting object connecting said identified message board and said "global" virtual message object;
   k. marking said "global" virtual message object as a "perspective" virtual message object;
   l. determining if at least one virtual message object is connected to said "perspective" virtual message object as an "embedded" object;
   m. determining if reference for said "embedded" message refers to a valid attachment relevant to a current one of said "perspective" objects, and if so;
   n. locating a virtual message object corresponding to said referenced attachment and marking it as a new "perspective" object;
   o. locating each immediate message object of said "perspective" object and forming a response; and,
   p. transmitting a response to said one of said clients.

12. The method as in claim 11 wherein said "get" request is for content, further including the steps of:
   a. requesting envelope and body of a specific message; and,
   b. extracting envelope and body of said "perspective" object and forming them into a response; and,
   c. transmitting said response to said one of said clients.

13. The method as in claim 11 herein said "perspective" object has no embedded message objects, transmitting a "null list" response to said one of said clients.

14. The method as in claim 11 wherein said step of marking said "global" virtual message object, further including the steps of:

a. determining if said message reference identified in step e. refers to an attachment, and if not, b. locating each immediate message object of said "perspective" object, and forming a response; and, c. transmitting a response to said one of said clients.

15. The method as in claim 11 wherein said step of determining if reference for "embedded" message refers to a valid attachment further comprises the steps of:

a. determining if said "perspective" virtual message object has an embedded message, and if not;

b. parsing envelope of said "perspective" object to find a separator field value;

c. parsing body of said "perspective" object to find each embedded message which will be delimited by said separator field value;

d. creating a new virtual message object;

e. connecting said new virtual message object to said "perspective" object as an embedded message;

f. connecting said new virtual message object to said "global" virtual message object as an "ancestor" object; and, g. determining if there are more embedded messages, and if so, repeating steps d, e and f hereof.

* * * * *